United States Patent
Frank et al.

(10) Patent No.: US 10,318,979 B2
(45) Date of Patent: Jun. 11, 2019

(54) INCENTIVE-BASED CROWDVOTING USING A BLOCKCHAIN

(71) Applicant: International Business Machines Corporation, Armonk, NY (US)

(72) Inventors: Brandon Z. Frank, Princeton, NJ (US); Joseph A. Latone, San Francisco, CA (US)

(73) Assignee: International Business Machines Corporation, Armonk, NY (US)

(*) Notice: Subject to any disclaimer, the term of this patent is extended or adjusted under 35 U.S.C. 154(b) by 280 days.

(21) Appl. No.: 15/390,594

(22) Filed: Dec. 26, 2016

(65) Prior Publication Data
US 2018/0181979 A1    Jun. 28, 2018

(51) Int. Cl.
*G06Q 30/00* (2012.01)
*G06Q 30/02* (2012.01)
*G06Q 50/02* (2012.01)

(52) U.S. Cl.
CPC ......... *G06Q 30/0217* (2013.01); *G06Q 50/02* (2013.01)

(58) Field of Classification Search
None
See application file for complete search history.

(56) References Cited

U.S. PATENT DOCUMENTS

| | | | | |
|---|---|---|---|---|
| 2007/0233544 A1* | 10/2007 | Frank | ............... | G06Q 10/10 705/310 |
| 2012/0284090 A1* | 11/2012 | Marins | ............... | G06Q 10/0631 705/7.39 |
| 2012/0296845 A1 | 11/2012 | Andrews et al. | | |
| 2016/0012424 A1* | 1/2016 | Simon | ............... | G06Q 20/3674 705/67 |
| 2016/0062978 A1 | 3/2016 | Newman | | |
| 2016/0300252 A1 | 10/2016 | Frank et al. | | |
| 2017/0005804 A1* | 1/2017 | Zinder | ............... | H04L 9/3247 |
| 2017/0103472 A1* | 4/2017 | Shah | ............... | G06N 5/02 |
| 2017/0243193 A1* | 8/2017 | Manian | ............... | G06Q 20/3829 |
| 2017/0364825 A1* | 12/2017 | Tiell | ............... | G06Q 10/0635 |
| 2018/0005186 A1* | 1/2018 | Hunn | ............... | G06F 17/211 |

OTHER PUBLICATIONS

Nylund et al., "Crowdsourcing in Media." Arcada Work Papers 4/'(2014).
Nag, Collaborative competition for crowdsourcing spaceflight software and STEM education using SPHERES Zero Robotics. Diss. Massachusetts Institute of Technology, 2012.
Lasecki et al. "Speaking with the crowd." Adjunct proceedings of the 25th annual ACM symposium on User interface software and technology, ACM, 2012.
Catallo, Achieving quality in crowdsourcing through task design and assignment. Diss. Italy, 2015.
Brabham, "Using crowdsourcing in government." IBM Center for the Business of Government (2013): 1-42.
Posetti,. "The 'twitterisation' of investigative journalism." (2013): 88. In S. J.. Tanner & N. Richardson (Eds.), Journalism Research and Investigation in a Digital World (pp. 88-100). South Melbourne: Oxford University Press.

* cited by examiner

*Primary Examiner* — Matthew T Sittner

(57) ABSTRACT

An instant operation may include one or more of creating a smart contract identifying content and review requirements for performing a review of the content, signing and validating the smart contract, storing the smart contract in a blockchain, receiving content review feedback from one or more reviewers of the content, and amending the blockchain to include the content review feedback.

18 Claims, 5 Drawing Sheets

350

US 10,318,979 B2

INCENTIVE-BASED CROWDVOTING USING A BLOCKCHAIN

TECHNICAL FIELD

This application relates generally to crowdsourcing, and more particularly, to incentive-based crowdvoting using a blockchain.

BACKGROUND

A blockchain may be used for various financial transactions due to the nature of a shared ledger system. Crowdsourcing has been implemented to achieve certain results. For example, most website operators or owners want users to stay engaged with the site for as long as possible because the longer a user interacts with the site, the more revenue the company can obtain (for example, from sales or from advertising). Curation or review may be used to rank web content, placing the richest and most prevalent content at the top of a site's data feed, reducing a bounce rate by engaging the consumer. Traditional approaches for voting and other review types are not conducive to live content outlets, such as news and live stream video, and thus conventional approaches lack spontaneity and a network of dedicated individuals who are continuously and effectively reviewing. While curating content in certain cases can be defined as a simple ranking of the content (which may suffice if already viewed by a large audience with real-time content), ranking based on a number of views or a 'like' would be an inaccurate measure of quality due to a lack of distribution. Additionally, curation/review cannot effectively be performed by the website operator or owner since an in-house team cannot properly represent the views of the consumer or entire user base without some bias. Further, voting on content may be computer generated, may not take place in real-time, and may fail to consider how much of the content the reviewer actually consumed.

SUMMARY

One example method of operation may comprise one or more of creating a smart contract, identifying content and review requirements for performing a review of the content, signing and validating the smart contract, storing the smart contract on the blockchain, receiving content review feedback from one or more reviewers of the content, and amending the blockchain to include the content review feedback.

Another example embodiment may include an apparatus that includes a processor configured to perform one or more of, create a smart contract that identifies content and review requirements to perform a review of the content, sign and validate the smart contract, store the smart contract in a blockchain, and a receiver configured to receive content review feedback from one or more reviewers of the content, and wherein the processor is further configured to amend the blockchain to include the content review feedback.

Yet another example embodiment may include a non-transitory computer readable storage medium configured to store instructions that when executed cause a processor to perform one or more of creating a smart contract, identifying content and review requirements for performing a review of the content, signing and validating the smart contract, storing the smart contract on the blockchain, receiving content review feedback from one or more reviewers of the content, and amending the blockchain to include the content review feedback.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Crowdvoting, related to crowdsourcing, aims to engage communities by fostering collaboration and organization via the ranking of digital content. The generally accepted '1:10:89' rule suggests that among 100 people, 1 person may publish original content, 10 people will vote on the content, and 89 will passively consume it. The instant application, in one embodiment, uses a blockchain as a tool for crowdsourcing, and more particularly, to submit smart contracts to a blockchain to have reviewers access and review content to provide crowd-based voting feedback or 'crowdvoting' for various applications.

Figure 1:
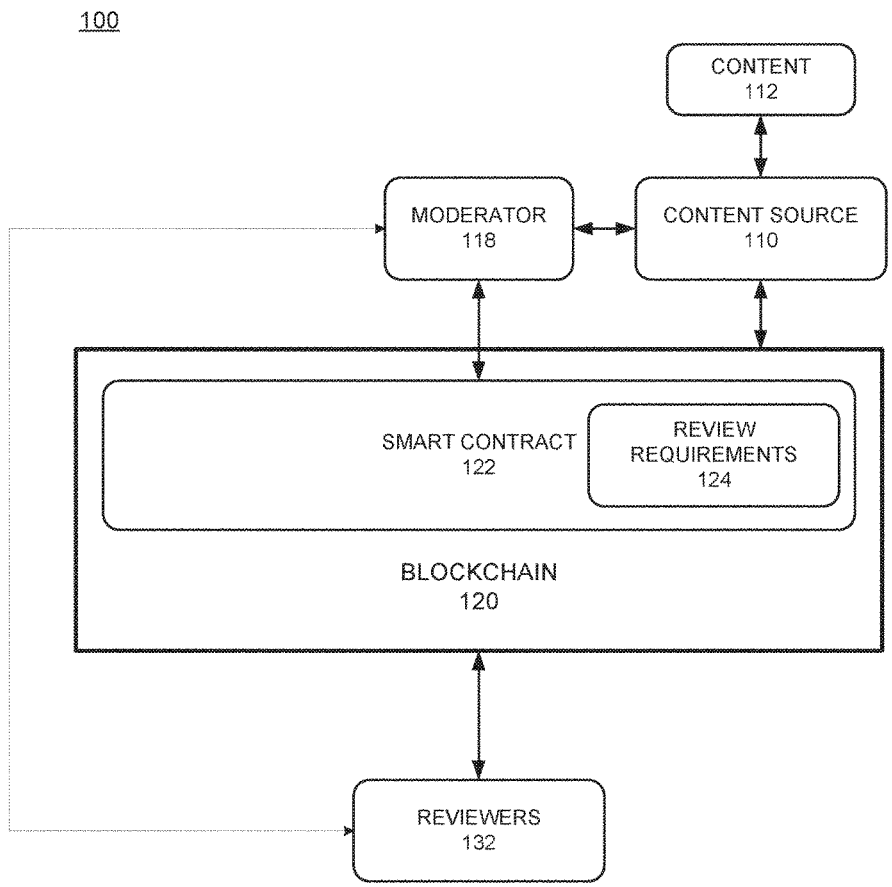
FIG. 1 illustrates a blockchain logic diagram of storing content review smart contracts in a blockchain for peer review according to example embodiments.

FIG. 1 illustrates a blockchain logic diagram of storing smart contracts in a blockchain for review (for example by peer review) according to example embodiments. Referring to FIG. 1, the logic block diagram example 100 includes various components that can be found on one or more devices including a processor and memory. A content source 110 identifies content 112 to be reviewed or 'crowdvoted' by reviewers 132. The moderator 118 is responsible for creating the smart contract 122 which is distributed to the blockchain 120. The smart contract has various requirements 124 for completing the review which is adhered to in order to successfully complete the review and be compensated for the review. The ideal crowdvoting network relies on properties of the blockchain such as CPU power consumption, standard currency, reputation, and an immutable lineage of past actions to create a fair crowdvoting environment. The moderator cannot place the contract on the blockchain so the moderator will always receive data from either the source or the curator, generate the contract, and send it back to the same entity. That entity will then mine the contract which is the action that places it on the blockchain.

The proposed 'crowdvoting' platform targets real-time curation/review and includes several components. For example, a content aggregator (the content source 110) may have content to be reviewed/curated by a network of curators/reviewers 132 who are active on the blockchain 120. The mutual trust required between the source 110 and the moderator 118, as well as reviewers 132 and the moderator 118 is 'relative'. The financial transactions are trustless, and are bound by the inherit nature of the blockchain.

The original contract mined to the blockchain by the source is visible to all parties, however, it is only modifiable by the one who mined the contract. As a result, when curators need to be added to the list of those who voted, the moderator requires the source to add the curator's public key before the vote is mined to the blockchain. The moderator only provides consistency with contract format. The moderator does not mine anything and therefore has no control over the chain. The moderator, who is a facilitator, certifies the number of votes that should be required for a piece of content to be considered curated. The system is trustless, the curator is ensured they will be paid and the source is assured that the vote is legitimate.

In operation, the source 110 may have content that must be rated/reviewed. The source sends the content and metadata to the moderator 118 who will generate a contract to be placed on the blockchain. The moderator 118, taking the data provided, such as sensitivity level of the content, the time limit imposed, and using publicly available data derived from the blockchain, may determine the number of reviewers that would need to be surveyed to produce a statistically significant average vote which is included in the contract. Since the blockchain is a ledger it can be determined who are 'active' users and how long each user has been performing a review. Their reputation may be pubic, so if individuals with higher reputations are reviewing/curating then less reviewers are needed for the curation. This is where the content sensitivity may be worth considering. By using machine learning, one can discern the curators bias based on how they voted on past articles, analyzing how their vote deviated from an average vote. All these factors may be taken into account so the number of curators appropriate to curate a specific portion of content can be determined.

The use of the moderator at this stage is not critical but ensures key properties of the contract are not omitted by the source. A moderator's signature signifies a contract which is fully 'intact'. By sending the contract back to the source, it is the source that pays for the CPU power to place the contract on the blockchain and have the reviewers review the content. The micro-payment in the form of CPU power prevents bogus content from being placed on the blockchain. CPU power can be identified as an expense to the entity mining the contract, for example, CPU power costs money in the form of electricity to perform certain actions. CPU power provides a way to ensure the blockchain is not flooded with smart contracts/votes. By making an entity pay to use the blockchain they still can perform all actions however, it costs them actual money. For example, miners 'pay' by using electricity to mine.

A time limit may be imposed based on the type of event associated with the content, for example, the streaming of a sporting event. If the game is finished, there is no longer any point in reviewing the content feed. That type of feed would last for under an hour so a curation time under 10 minutes would be desired. In another example, a car race may last for multiple hours where a curation time of under 30 may be more appropriate.

With regard to the source, the source may have a pair of cryptographic keys and may request a contract from the moderator and send data signed by a source private key. The data may include a 'SourcePublicKey', a content URL, a sensitivity level determined using machine learning set by the source, and an expiration time/date when content needs to be reviewed. With regard to the moderator, the moderator receives the data, verifies the integrity of the data sent by the source by verifying the signature, generates contract data, signs the data via a 'ModeratorPrivateKey'. The data includes a 'SourcePublicKey', a content URL, date received, number of votes/reviews required (based on sensitivity level), expiration time/date, and a smart contract. The smart contract may include a curators list which may be mutable that reviewers will be added to. If a number of votes is reached, the source will release funds to curators. The Source is required to have the funds available. They can convert standard currency to 'altcoins' at the going market rate to pay the curators. There is a classification difference between altcoins that are converted from standard currency and those that are acquired as a result of a smart contract. The source receives the contract data, mines the contract thus placing it on the blockchain. If the content is relevant and has contested view points, then the content is deemed "sensitive". This is similar to online platforms that will only permit those with over 'x' reputation commentary on posts that mention anything political. Content on the blockchain that is more sensitive would require more people to review the content and possibly require a more stringent weighting system for the votes that are received.

The reviewer/curator assigns a score to content on the blockchain. The reviewers who are assigned to review may monitor the blockchain and may identify a new moderator-signed contract available with content to be reviewed. Those seeking to review will view the content in a moderator authorized viewer that tracks the curator's time interacting with the content. Any such application will provide a record of time, verification the correct content was reviewed, etc. When rating the content, the interaction time that was recorded is securely sent to the moderator to generate the reviewer's vote contract. The contract generated will possess an element that permits the curator to pay more for a vote bearing a higher weight. The reviewer cannot bypass this operation because during this stage, the moderator sends the reviewers' information to the source, which must add the reviewer to the original contract for them to get paid. The source is the only party who has mutable access to the original content contract on blockchain. This is performed prior to the vote contract being sent back to the reviewer and being mined so the source must pay the reviewer for the vote.

The reviewer will then mine their vote contract; and the moderator sending the contract to the reviewer to mine ensures they pay for the vote they are assigning to the content. As a result, reputation may be used to reduce CPU mining time for those reviewers who review frequently and in accordance with guidelines.

The curator or reviewer consumes the content in the moderator authorized viewer application, the reviewer may exit the content and assign a score, the application requests the contract from the moderator, the authorized viewer sends the data signed including a 'ModeratorApprovedViewerPublicKey', a 'CuratorPublicKey', and a 'ContentContractAddress'. This may be created when the source mined the contract. Also, data may further include an active time viewing the content, a score, a date/time stamp reviewed, and altcoins. The altcoins acquired through reputation, not those that can be converted from standard currency, can be traded in to reduce the amount of CPU that will be required when mining.

The moderator may verify the 'ModeratorApprovedViewerPublicKey' belongs to one of the pre-approved viewing applications, subsequently verify the signature, generate a contract that will be mined by the curator, but first the curator's public key must be sent to the source so when curated the curator will receive the appropriate funds. Next, the contract is signed via a 'ModeratorPrivateKey' and using a 'CuratorPublicKey' funds are provided once the contract is curated. The curator's assigned score may be padded with random bits to increase mining difficulty. There may be more CPU power required to mine the contract created, as contract size is proportional to mining time. This process can be decreased if the reviewer is willing to part with reputation (altcoins received through previous smart contracts). By trading in reputation, the reviewer can reduce the CPU time required to mine the vote. The date/time stamp reviewed will be factored into the funds the reviewer will receive.

As a 'reward' for voting, users receive altcoins which is a virtual currency distributed anonymously. Altcoins can be thought of as a level of reputation because if their vote is widely accepted they will in turn receive funds. Therefore, if someone has a large amount of altcoins they must have curated many smart contract and their votes had to have been widely accepted, similar to a transaction rating on a web site. When mining, one may pay for their own vote in electricity (i.e., cost of running a CPU). Mining is essentially solving a challenging math problem and this is proportional to the smart contract size. If the user does not want to spend a lot of money on their electric bill they can reduce the difficulty of the math problem by 'paying' with their reputation to make it easier. So they are forfeiting some reputation in return for receiving what they are attempting to obtain. They do this in hopes of the vote they are currently casting being widely accepted and providing them even more altcoins than they are foregoing. The varying of the math problem complexity is handled by the moderator. For example, the moderator pads the score with random values to make it larger, therefore increasing its complexity. By forfeiting altcoins the number of random bits appended are reduced and therefore the contract size is smaller and easier to mine. It should be made clear that there are various places online where one can trade altcoins for USD or any other currency if they wanted to 'cash out' some of their reputation.

The source may add the 'CuratorPublicKey' received to the smart contract object 'Curator list' in the contract. The moderator may send the vote contract to the reviewer. The curator/reviewer may mine the contract received, placing it on the blockchain. When the original content's smart contract registers the vote and is marked as complete based on the review requirements 124, those who voted receive a payout. The payment is in the form of reputation altcoins which can be converted to standard currency or can be used to reduce CPU time when mining future vote contracts.

Figure 2:
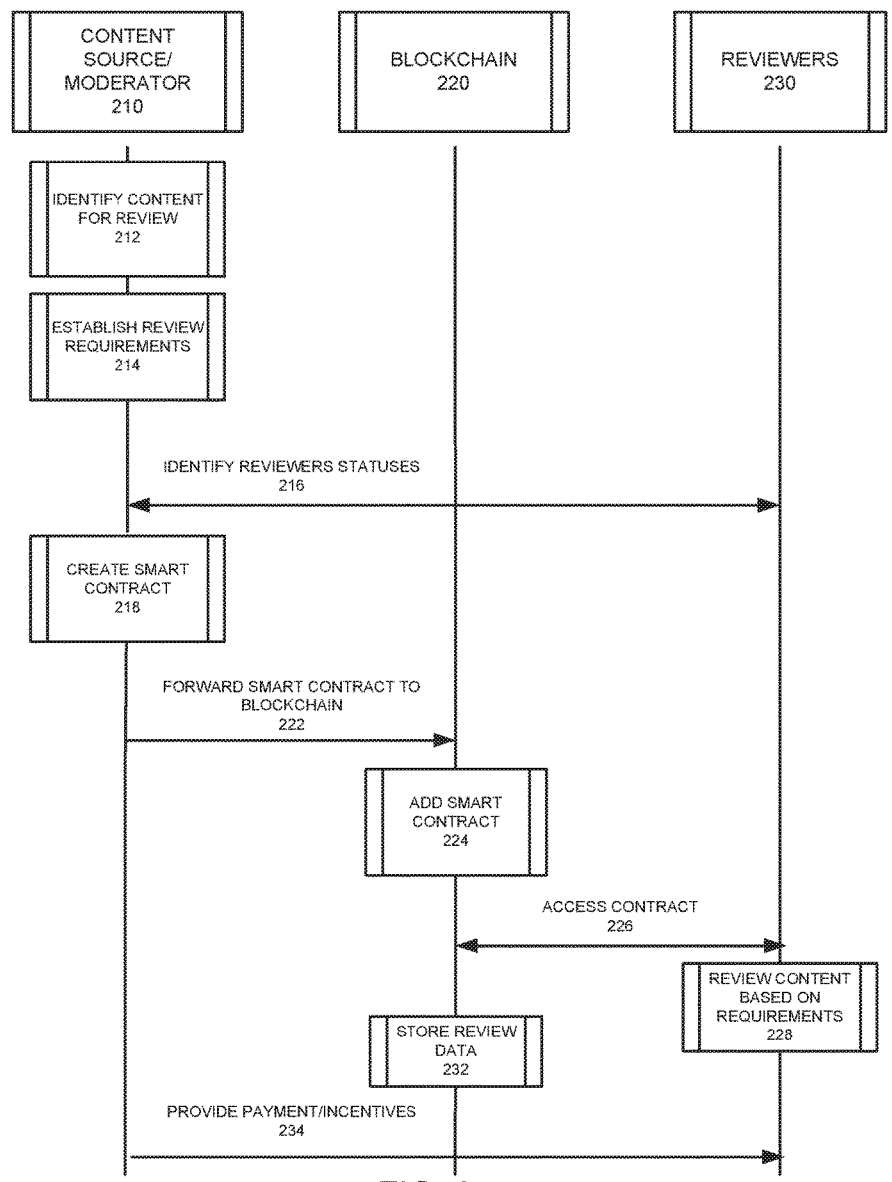
FIG. 2 illustrates a system signaling diagram of content review smart contracts setup by a content source for use in a blockchain for peer review by reviewers according to example embodiments.

FIG. 2 illustrates a system signaling diagram of content review smart contracts setup by a content source for use in a blockchain for peer review by reviewers according to example embodiments. Referring to FIG. 2, the system 200 includes a content source and/or moderator computer 210, a blockchain 220 located on computer 210, or another computer and one or more reviewers computer(s) 230. Then content may be identified for review 212 and certain review requirements 214 may be identified based on the content and other factors. The potential reviewers may be identified according to their reputation and/or other factors 216. The contract may be created 218 and sent to the blockchain 222 to be appended to the blockchain 224. The reviewers may access the contract 226 and the guidelines for performing the review. The review can then be performed by one or more selected reviewers 228. The review data can be updated and put in the blockchain 232 for accuracy and future audits. Once the requirements are met, the reviewers may be compensated 234 accordingly.

Figure 3A:
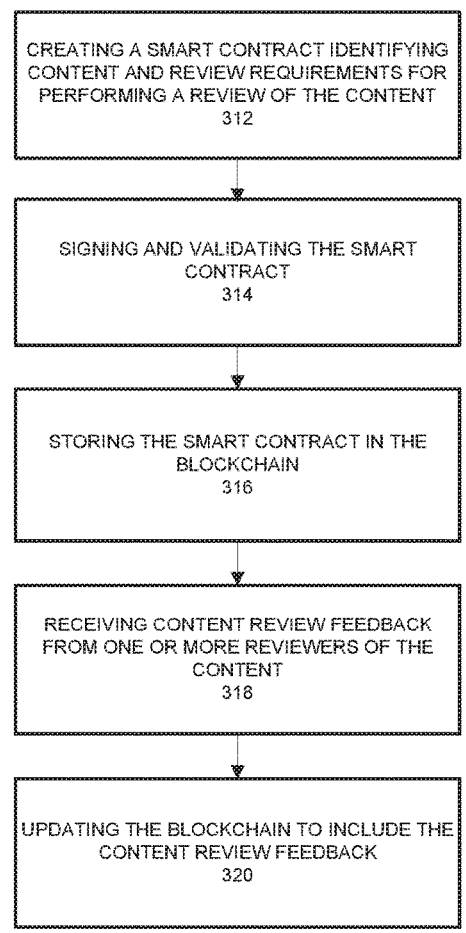
FIG. 3A illustrates a flow diagram of an example method of content peer review in the blockchain according to example embodiments.

FIG. 3A illustrates a flow diagram of an example method of content peer review in the blockchain according to example embodiments. Referring to FIG. 3A, the method 300 may include creating a smart contract identifying content and review requirements for performing a review of the content 312, signing and validating the smart contract 314, storing the smart contract in a blockchain 316, receiving content review feedback from one or more reviewers of the content 318, and updating the smart contract by mining additions, such as the votes to include the content review feedback 320. The method may also provide that the review requirements for performing the review of the content include one or more of a sensitivity level of the content, a number of reviewers needed to perform the review, and minimum time or maximum time needed to perform the content review. The method may also provide confirming the content review is complete, confirming the review requirements were followed when the content was reviewed, and providing a reward to the reviewers. The method may also provide determining an average vote requirement based on a number of reviewers affiliated with the blockchain, and determining a minimum number of the reviewers to fulfill the average vote requirement. The minimum number of reviewers to fulfill the average vote requirement is based on various factors. A few example factors may include one or more of a sensitivity level of the content and a time limit to complete the review, among other factors. The method may also provide storing the minimum number of the reviewers to fulfill the average vote requirement in the smart contract, transmitting the smart contract to a source of the content. In summary, the source mines the smart contract received from the moderator which places it on the blockchain.

Figure 3B:
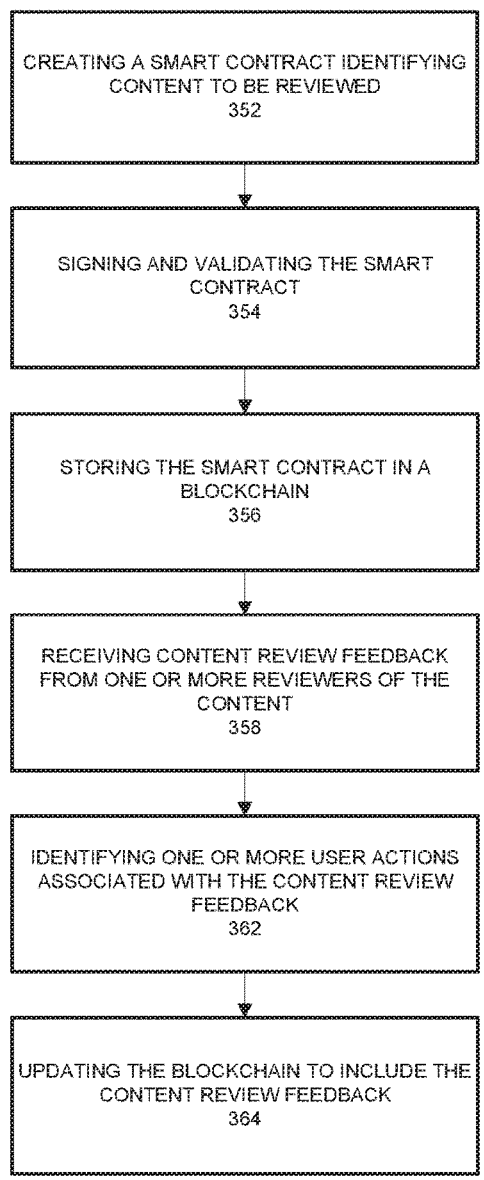
FIG. 3B illustrates a flow diagram of another example method of method of content peer review in the blockchain in the blockchain according to example embodiments.

FIG. 3B illustrates a flow diagram 350 of another example method of content peer review in the blockchain according to example embodiments. The method may provide creating a smart contract identifying content to be reviewed 352, signing and validating the smart contract 354, storing the smart contract in a blockchain 356, receiving content review feedback from one or more reviewers of the content 358, identifying one or more user actions associated with the content review feedback 362, and amending the blockchain to include the content review feedback 364.

In this embodiment, the content is reviewed according to the review guidelines or rules, however, the reviewer feedback may be based on more than just positive or negative feedback. For example, the user actions may be user behavior, reactions, emotions and/or gestures which are monitored and recorded via one or more peripheral sensors associated with the user interface (e.g., microphone, noise sensors, motion sensors, video camera, etc.). The user actions may be recorded during a review session and linked to the content timeline to provide the content originator with access to specific instances of user feedback during the course of the content playback. For instance, 30 seconds into a commercial being reviewed for user responses, a user may laugh out loud, or perform other actions which are recorded and used as the basis to identify portions of the content which are considered relevant, important, and/or critical to the success of the content at a later time. Also, this provides proof that the content works/does not work for its intended purpose. All of this information may be stored in the blockchain along with the feedback file for the content.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
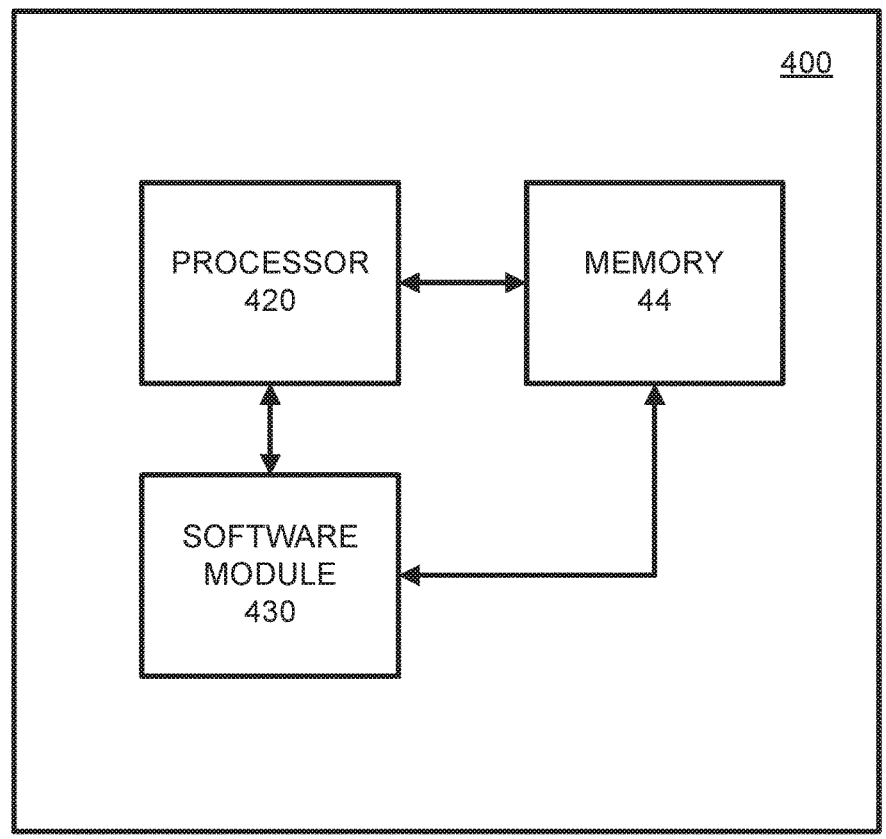
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    creating, via a computer-implemented moderator, a smart contract identifying content provided by a source and identifying review requirements for performing a review of the content via one or more reviewers, a size of the smart contract variably based on a moderator controlled complexity of a mathematical calculation required to mine the smart contract;
    signing and validating, via the computer-implemented moderator, the smart contract;
    communicating, via the computer-implemented moderator, the smart contract to the source to be stored in a blockchain for reviewing via the one or more reviewers;
    receiving, via the computer-implemented moderator, information regarding a review of the content by the one or more reviewers;
    generating, via the computer-implemented moderator, one or more vote contracts corresponding to the one or more users, the one or more vote contracts specifying a cost to the one or more reviewers to mine the corresponding one or more vote contracts to provide feedback on the content to the blockchain, the cost being based on the size of the smart contract;
    providing, via the computer-implemented moderator, the one or more vote contracts to the corresponding one or more users for mining by the one or more reviewers to store the feedback on the blockchain; and
    forwarding, via the computer-implemented moderator, compensation from the source to the one or more reviewers based on the review requirements for performing a review of the smart contract being met by the one or more reviewers.

2. The method of claim 1, wherein the review requirements for performing the review of the content comprise:
    one or more of a sensitivity level of the content, a number of reviewers needed to perform the review, and minimum time or maximum time needed to perform the content review.

3. The method of claim 1, further comprising:
    confirming the review of the content is complete; and
    confirming the review requirements were followed when the content was reviewed.

4. The method of claim 1, further comprising:
    determining an average vote requirement based on a number of reviewers affiliated with the blockchain; and
    determining a minimum number of the reviewers to fulfill the average vote requirement.

5. The method of claim 4, wherein the minimum number of reviewers to fulfill the average vote requirement is based on one or more of a sensitivity level of the content and a time limit to complete the review.

6. The method of claim 4, further comprising:
    storing the minimum number of the reviewers to fulfill the average vote requirement in the smart contract.

7. An apparatus, comprising:
    a computer-implemented moderator in communication with a content source, a blockchain, and one or more content reviewers, the computer-implemented moderator configured to:
        create a smart contract that identifies content provided by the source and identifies review requirements to perform a review of the content via the one or more reviewers, a size of the smart contract variably based on a moderator controlled complexity of a mathematical calculation required to mine the smart contract;
        sign and validate the smart contract;
        communicate the smart contract to the source to be stored in the blockchain for review via the one or more reviewers;
        receive information regarding a review of the content by the one or more reviewers;
        generate one or more vote contracts corresponding to the one or more users, the one or more vote contracts specifying a cost to the one or more reviewers to mine the corresponding one or more vote contracts to provide feedback on the content to the blockchain, the cost being based on the size of the smart contract;
        provide the one or more vote contracts to the corresponding one or more users for mining by the one or more reviewers to store the feedback on the blockchain; and
        forward compensation from the source to the one or more reviewers based on the review requirements for performing a review of the smart contract being met by the one or more reviewers.

8. The apparatus of claim 7, wherein the review requirements to perform the review of the content comprise:
    one or more of a sensitivity level of the content, a number of reviewers needed to perform the review, and minimum time or maximum time needed to perform the content review.

9. The apparatus of claim 7, wherein the processor is further configured to:
    confirm the review of the content is complete; and
    confirm the review requirements were followed when the content was reviewed.

10. The apparatus of claim 7, wherein the processor is further configured to:
    determine an average vote requirement based on a number of reviewers affiliated with the blockchain; and
    determine a minimum number of the reviewers to fulfill the average vote requirement.

11. The apparatus of claim 10, wherein the minimum number of reviewers to fulfill the average vote requirement is based on one or more of a sensitivity level of the content and a time limit to complete the review.

12. The apparatus of claim 11, wherein the processor is further configured to:
    store the minimum number of the reviewers to fulfill the average vote requirement in the smart contract.

13. A non-transitory computer readable storage medium configured to store at least one instruction that when executed by a processor of a device implementing a blockchain causes the processor to perform:

creating, via a computer-implemented moderator, a smart contract identifying content provided by a source and identifying review requirements for performing a review of the content via one or more reviewers, a size of the smart contract variably based on a moderator controlled complexity of a mathematical calculation required to mine the smart contract;

signing and validating, via the computer-implemented moderator, the smart contract;

communicating, via the computer-implemented moderator, the smart contract to the source to be stored in a blockchain for reviewing via the one or more reviewers;

receiving, via the computer-implemented moderator, information regarding a review of the content by the one or more reviewers;

generating, via the computer-implemented moderator, one or more vote contracts corresponding to the one or more users, the one or more vote contracts specifying a cost to the one or more reviewers to mine the corresponding one or more vote contracts to provide feedback on the content to the blockchain, the cost being based on the size of the smart contract;

providing, via the computer-implemented moderator, the one or more vote contracts to the corresponding one or more users for mining by the one or more reviewers to store the feedback on the blockchain; and forwarding, via the computer-implemented moderator, compensation from the source to the one or more reviewers based on the review requirements for performing a review of the smart contract being met by the one or more reviewers.

14. The non-transitory computer readable storage medium of claim 13, wherein the review requirements for performing the review of the content:

comprises one or more of a sensitivity level of the content, a number of reviewers needed to perform the review, and minimum time or maximum time needed to perform the content review.

15. The non-transitory computer readable storage medium of claim 13, further configured to store at least one instruction that when executed by the processor causes the processor to perform:

confirming the review of the content is complete; and
confirming the review requirements were followed when the content was reviewed.

16. The non-transitory computer readable storage medium of claim 13, further configured to store at least one instruction that when executed by the processor causes the processor to perform:

determining an average vote requirement based on a number of reviewers affiliated with the blockchain; and
determining a minimum number of the reviewers to fulfill the average vote requirement.

17. The non-transitory computer readable storage medium of claim 16, wherein the minimum number of reviewers to fulfill the average vote requirement is based on one or more of a sensitivity level of the content and a time limit to complete the review.

18. The non-transitory computer readable storage medium of claim 16, further configured to store at least one instruction that when executed by the processor causes the processor to perform:

storing the minimum number of the reviewers to fulfill the average vote requirement in the smart contract; and
transmitting the smart contract to a source of the content.

* * * * *